F. DOUGLAS.
Planing Machine.
No. 106,139.  Patented Aug. 9, 1870.
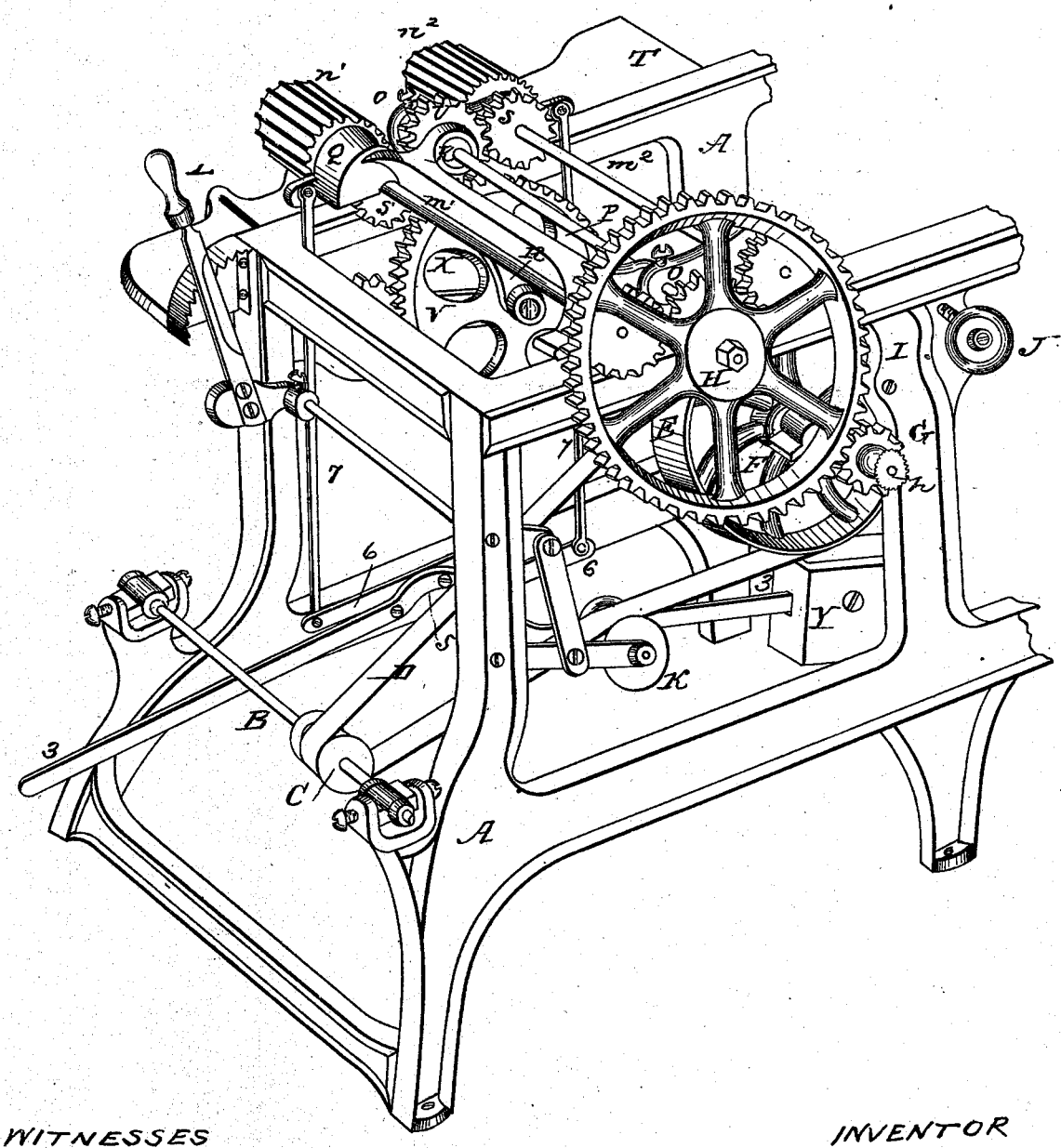
WITNESSES
Albert L Bolles
C. H. Douglas
INVENTOR
Frank Douglas

United States Patent Office.

FRANK DOUGLAS, OF NORWICH, CONNECTICUT.

Letters Patent No. 106,139, dated August 9, 1870.

IMPROVEMENT IN PLANING-MACHINES.

The Schedule referred to in these Letters Patent and making part of the same.

I, FRANK DOUGLAS, of Norwich, county of New London and State of Connecticut, have invented certain Improvements in Feed-Works for Wood-Planing Machines, of which the following is a specification.

The first part of my invention relates to a method of driving the feed-rolls, by which a variety of changes in the feed, or in the rapidity with which the work is fed to the cutter-heads, may be effected, without changing the feed-belt.

The second part relates to the method of connecting the feed-rolls by expansion gearing, and their relation to each other.

The perspective view of a section of the machine shows all the parts so clearly that no other views are required.

A A represent the frame-work of the machine.

B, a section of the driving-shaft, from which the cutter-heads and the feed-works are driven.

The belt D, driven by pulley C, communicates power to pulley E, which is tightly secured to the shaft, passing through long shaft F.

Pinion G is held on the end of the shaft by nut $h$.

The whole power communicated to the feed-rolls is transmitted from pinion G, through large intermediate gear H.

The long sleeve-box F is pivoted on pin I, through the arm of the box that extends up to clamping wheel or nut J.

Any change of feed required is effected by removing pinion G, and placing a larger or smaller pinion in its place.

A large variety of feed can be thus effected, without any change in the feed-belt D.

To stop the feed while the machine is running, the tightening-arm and pulley K is thrown down from the belt D by moving handle L up toward the machine, and by drawing the handle back from the machine, the belt D is tightened to the required tension.

The feed-roll shafts $M^1$ $M^2$ are geared both sides of the machine, and the feed-rolls $N^1$ $N^2$ are attached to their overhanging ends.

The feed-shaft $M^2$ is hung in arm-boxes $o$ $o$, that are attached to the fixed shaft P.

Shaft P is held to its place by ears on each side of the machine, through which it passes.

Yoke Q, which forms the bearings for feed-shaft $M^1$, is made of a casting that extends across the machine, and swings loosely on fixed shaft P, at one end, and on the hub of arm R at the other.

It also forms a hood over driving-pinion $s$, and has a bearing for the feed-roll shaft between pinion $s$ and the feed-roll.

The feed-roll in bed T, lying under roll $N^1$, is driven by pinions $s$ $s'$, through the pinion U, which turns loosely on fixed shaft P, and conveys the power to large expansion gear V, which acts as an intermediate to drive pinion W, which is firmly attached to the end of under feed-roll shaft.

Expansion gear V is held in its proper place or relation to pinions U and W by arms R and X.

Arm X is fitted to the end of box for under feed-roll at one end, and at the other has a pin that passes through hub of expansion gear V, and receives the lower end of arm R, allowing gear V to turn freely on the pin between the arms.

The upper end of arm R works loosely on fixed shaft P.

When the bed T is raised or lowered, arms R and X hold gear V in its proper place or relation to pinions U and W.

The rolls $N^1 N^2$ are pressed down upon the stock to be worked by weight Y, that slides on lever 3, which is pivoted to the side of frame A, at 4, and has a fulcrum over pin 5, in cross-bar 6 6.

To bar 6 6 are attached the upright rods 7 7', one of which is attached to yoke Q, and the other to arm O.

The end of lever 3' extends through the back of machine, for the operator to press down with his foot, when he wishes to raise the rolls for adjustment of work, &c.

The operation of the parts are as follows:

When the operator wishes to increase the speed of the feed rolls, he turns the wheel or nut J, unclamping the arm of box F, which allows pinion G to drop down out of gear.

Pinion G is then removed, and one of a larger size put in its place, when the pinion is again swung into gear, and locked by nut-wheel J.

When more or less weight is required on the feed-rolls, weight Y is moved out or in on lever 3, and when the weight should be relieved from the rolls, for the adjustment of work, &c., the operator steps on lever 3', which raises the rolls, and allows him both hands for the removal of the work or its adjustment.

The bed is raised and lowered in the usual way.

Claim.

What I claim as my invention, and desire to secure by Letters Patent, is—

1. The swinging box F, with pulley E and its shaft and pinion G, in combination with the feed-rolls of a planing-machine, when constructed and operating substantially in the manner herein set forth.

2. The yoke Q and arms R and X, in combination with gears S, V V, and W, as and for the purpose herein set forth.

FRANK DOUGLAS.

Witnesses:
ALBERT S. BOLLES,
C. H. DOUGLAS.